United States Patent [19]

Erdmannsdörfer

[11] 4,203,739
[45] May 20, 1980

[54] SEPARATOR DEVICE FOR REMOVING OIL FROM AN AIR STREAM

[75] Inventor: Hans Erdmannsdörfer, Ludwigsburg, Fed. Rep. of Germany

[73] Assignee: Filterwerk Mann & Hummel GmbH, Ludwigsburg, Fed. Rep. of Germany

[21] Appl. No.: 926,245

[22] Filed: Jul. 20, 1978

[30] Foreign Application Priority Data

Aug. 27, 1977 [DE] Fed. Rep. of Germany ... 7726666[U]

[51] Int. Cl.² .............................................. B01D 50/00
[52] U.S. Cl. ........................................ 55/323; 55/482; 55/487; 210/315
[58] Field of Search ................ 55/187, 323, 482, 483, 55/485–489; 210/315, 338, 339

[56] References Cited

U.S. PATENT DOCUMENTS

| | | | |
|---|---|---|---|
| 1,328,044 | 1/1920 | Hills | 210/315 X |
| 3,415,041 | 12/1968 | Kraissl, Jr. | 210/315 X |
| 3,721,069 | 3/1973 | Walker | 55/487 X |

FOREIGN PATENT DOCUMENTS

988692 4/1965 United Kingdom .

Primary Examiner—Robert H. Spitzer
Attorney, Agent, or Firm—Joseph A. Geiger

[57] ABSTRACT

A separator device for removing the oil from an oil-carrying air stream, the device comprising two concentrically spaced oil separator elements which are mounted inside a cylindrical housing in such a way that the air stream is forced successively through a coarse filter body and a fine filter body, where the oil droplets are trapped and collected, accumulating inside the spaced bottom covers of the two separator elements. Separate oil suction pipes serve to remove the accumulated oil from the device.

4 Claims, 1 Drawing Figure

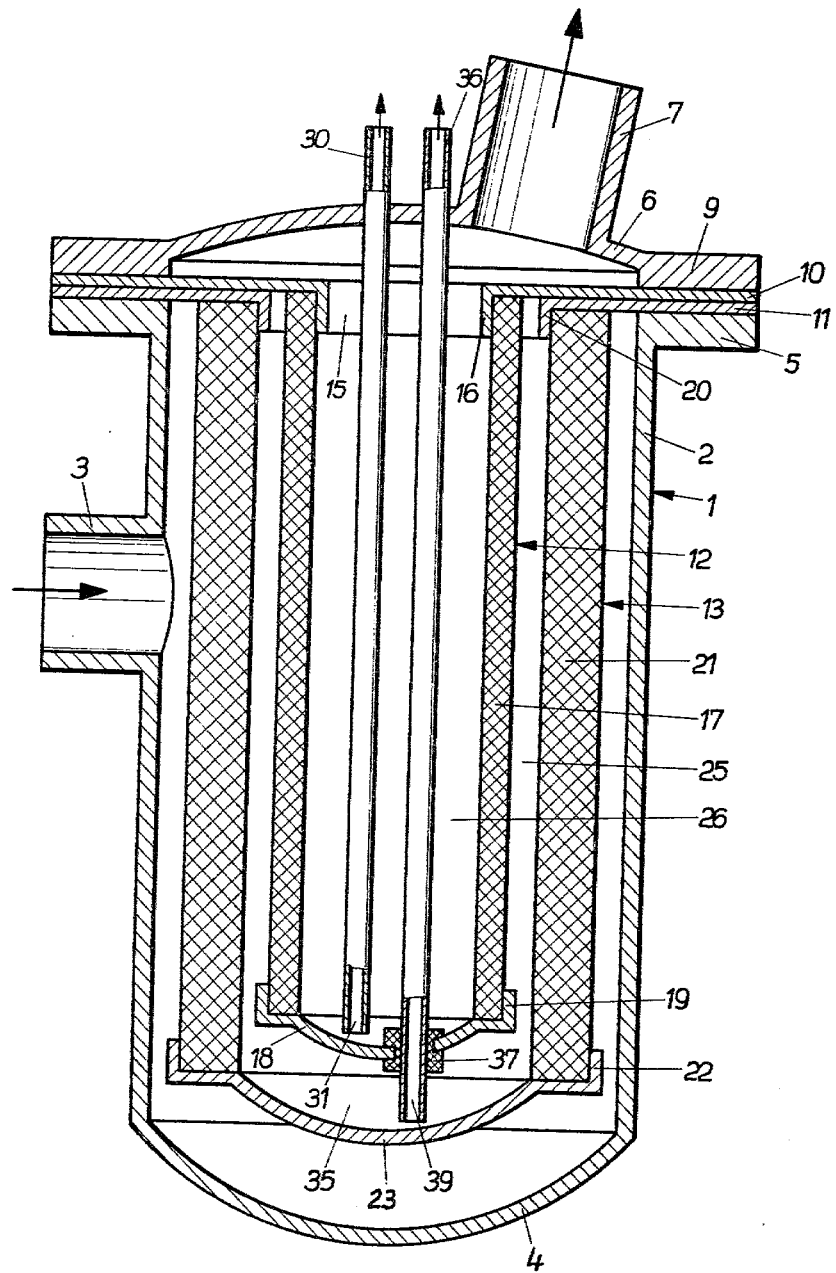

SEPARATOR DEVICE FOR REMOVING OIL FROM AN AIR STREAM

BACKGROUND OF THE INVENTION

1. Field of the Invention

The present invention relates to air filtering and separating devices and, more particularly, to a separator device for the removal of oil from an air stream carrying a mist of oil droplets.

2. Description of the Prior Art

Oil separators of the above-mentioned type are used primarily in connection with the reclamation of the oil mist which is contained in the compressed air produced by rotary compressors, especially screw-type compressors, which require the oil for lubrication. The size of the oil droplets which are to be removed from the air is comparatively small and extends into the region of aerosol-type mist, with a droplet size of less than 0.1 $\mu$m. In order to achieve a greater degree of oil removal, it has already been suggested that oil separators be designed to operate in consecutive filtering stages, the air flowing first through a separator element with a comparatively coarse structure and, from there, through a second separator element with a finer filter body structure.

One such prior art oil separator is known from the British Pat. No. 988,692. This oil separator features two concentrically spaced tubular separator elements through which the oil-carrying air stream is forced to flow in a radial direction. The two separator elements are of fine and coarse structure, respectively, but, contrary to what one might expect, the first, outer filter element has a fine glass fiber structure, while the second, inner filter element has a coarser wire mesh structure. An annular gap separates the two cylindrical filter elements.

This prior art device is intended to produce an oil separating action in which the fine droplets are collected into larger oil droplets by the first separator element, whereupon the larger droplets are carried by the air stream, across the intermediate air gap, to the coarser separator element which holds and further collects the droplets, allowing them to flow downwardly into a collecting chamber. The upper and lower ends of both separator elements are formed by common top and bottom plates, and it is thus necessary for the oil which has collected in the space between the inner and outer separator elements to traverse the inner element, in order to reach the collection chamber from which it can be removed via a suction pipe. While the collection chamber for the oil is separated from the outflowing air stream by an axial cover panel, the device does not include any means which prevent a certain capillary action of the inner separator element on the oil which has accumulated in the bottom portion of the space between the outer and inner elements, thereby lifting some of that oil back into the air stream.

SUMMARY OF THE INVENTION

Underlying the present invention is the primary objective of improving upon the earlier-described known oil separator device in such a way that, with the use of elements of simple and inexpensive structural components, the degree of oil separation is increased over that achieved by the prior art.

The invention proposes to attain this objective by suggesting a cylindrical, vertically arranged oil separator device with two concentrically spaced tubular separator elements, where the air flows radially through the coarser outer element and from there through the finer inner element. The two separator elements have separate bottom covers with an intermediate air space defined therebetween, so that separate oil collecting spaces are provided from which the reclaimed oil can be removed by means of suction pipes.

This novel arrangement of the two separator stages features a complete spatial separation of the two filter bodies in the radial as well as axial sense, so that the oil which has been captured and removed by the first element cannot reach the second element through capillary action. This arrangement has been found to produce a higher efficiency of oil separation.

The present invention further suggests, in a preferred embodiment, that the oil collected in the lower one of the two oil collection chambers be removed through a suction pipe which extends vertically through the interior of the inner separator element, traversing its bottom cover through a gasket.

BRIEF DESCRIPTION OF THE DRAWING

Further special features and advantages of the invention will become apparent from the description following below, when taken together with the accompanying drawing which illustrates, by way of example, a preferred embodiment of the invention as follows:

The sole FIGURE shows, in a longitudinal cross section, a cylindrical vertically arranged oil separator device.

DESCRIPTION OF THE PREFERRED EMBODIMENT

The oil separator which is shown in the drawing consists essentially of a pot-shaped separator housing 1 with a cylindrical housing wall 2 and a downwardly domed bottom end 4. A raw air intake 3, arranged slightly above mid-height of the housing 1, leads radially through the housing wall 2. The upper end of the separator housing 1 is sealed off by means of a removable housing cover 6 which opens into an upwardly extending clean air outlet 7. The tubular radial raw air intake 3 and vertical clean air outlet 7 serve for the connection of suitable air flow conduits (not shown).

The separator housing 1 has a top flange 5, and the housing cover 6 has a matching cover flange 9 for a clamped connection. Between these two flanges are confined the two upper cover discs 10 and 11 of two separator elements 12 and 13, respectively, which are suspended, in a concentrically spaced relationship, inside the separator housing 1. The element cover disc 10, positioned above the element cover disc 11, extends radially closer to the center of the device, carrying the inner separator element 12 on a collar-like crimped border 16 which defines a central air exit opening 15. The separator element 12 consists essentially of a tubular filter body 17 which is arranged concentrically with the vertical separator axis and which is carried by the element cover disc 10. The lower end of the separator element 12 is sealed off by means of a bottom cover 18 which has an upwardly oriented crimped border 19 engaging the bottom extremity of the filter body 17.

The second element cover disc 11, extending radially a lesser distance into the separator housing 1, carries the larger outer separator element 13, attached to a crimped border 20 of the cover disc 11. The filter body 21 of the outer separator element 13 is of coarser fiber structure than the filter body 17 of the inner element 12. The bottom end of the outer separator element 13 is likewise sealed off by means of a bottom cover 23, the latter being similarly attached to the lower extremity of the filter body 21 by means of a crimped border 22.

The two separator elements 12 and 13 are arranged in a concentrically spaced relationship, defining between them an annular intermediate space 25. At the inside of the inner separator element 12 is further arranged a first oil suction pipe 30 which extends vertically from a point near the bottom cover 18 to a point above the housing cover 6. The oil suction pipe 30 serves to remove the reclaimed oil from the device, after it enters the pipe 30 through an oil intake opening 31 at its bottom extremity.

The bottom cover 18 of the inner separator element 12 is arranged at a higher level than the bottom cover 23 of the outer separator element 13, thereby defining an axial space 35 between them. Into this axial space 35 reaches a second vertical oil suction pipe 36 which extends alongside the first oil suction pipe 30, from above the housing cover 6 to a point just above the bottom cover 23, where the pipe 36 has its oil intake opening 39. A gasket 37 in the smaller bottom cover 18 seals the passage of the second oil suction pipe 36 through that cover.

In operation, the oil-mist-carrying raw air enters the separator housing 1 through the raw air intake 3, traversing successively the outer separator element 13 and the inner separator element 12 by flowing radially through their filter bodies 21 and 17, respectively. The somewhat coarser structure of the outer filter body 21, in contact with the tiny droplets of oil carried by the passing air, traps and collects these tiny oil droplets, thereby forming larger droplets which, under the influence of gravity, flow downwardly inside and alongside the separator element 13, collecting on the inside of its bottom cover 23. Collected oil reaching the oil intake opening 39 of the second oil suction pipe 36 is removed through the latter.

As the partially cleaned air passed radially through the inner separator element 12, the more densely packed fibers of its filter body 17 entrap those oil droplets which may have passed through the outer separator element 12. These residual oil droplets, thus trapped and collected into larger droplets, also flow downwardly, collecting on the bottom cover 18 of the inner separator element 12. The collected oil, as it reaches the oil intake opening 31 of the oil suction pipe 30, is removed through the latter.

It should be understood, of course, that the foregoing disclosure describes only a preferred embodiment of the invention and that it is intended to cover all changes and modifications of this example of the invention which fall within the scope of the appended claims.

I claim the following:

1. A separator device adapted to remove oil from an air stream carrying a mist of oil droplets, the device comprising in combination:
    an enclosed separator housing having the shape of a pot with a vertical center axis, a generally vertical housing wall, a bottom end, and a removable housing cover;
    a raw air intake arranged laterally in the housing wall;
    a clean air outlet arranged in the housing cover;
    first and second air permeable oil separator elements, each having a tubular air permeable filter body, a bottom cover at the lower end of the filter body, and an open cover disc at the upper end of the filter body which serves as a mounting member for the separator element, the two separator elements being mounted inside the housing in such a way that the first element surrounds the second element, so that the interior space of the housing is subdivided into a raw air space between the raw air intake duct and the first separator element, an intermediate air space between the two separator elements, and a clean air space between the second separator element and the clean air outlet, thereby forcing the oil-carrying air stream to flow radially inwardly through the filter body of the first element, to traverse the intermediate air space, to flow radially inwardly through the filter body of the second element and to leave the latter through its open cover disc towards the housing cover and its clean air outlet;
    a first oil collecting space at a low point of the intermediate air space, for the accumulation of oil droplets collected by the first separator element;
    first conduit means leading from the first oil collecting space to the outside of the separator housing, for the removal of the accumulated oil from said space;
    a second oil collecting space at the low point of the clean air space, for the accumulation of oil droplets collected by the second separator element; and
    second conduit means leading from the second oil collecting space to the outside of the separator housing, for the removal of the accumulated oil from said space.

2. An oil separator device as defined in claim 1, wherein
    the first and second oil separator elements include first and second air-permeable filter bodies, respectively; and
    the first filter body has a coarser structure with larger air flow apertures than the second filter body.

3. An oil separator device as defined in claim 1, wherein
    the bottom cover of the second oil separator element is located a distance above the larger bottom cover of the first oil separator element;
    the upper sides of the two bottom covers serve as said first and second oil collecting spaces; and
    said first and second conduit means include an oil suction pipe extending axially through the housing cover, along the interior of the second separator element, and into the vicinity of the oil collecting spaces on the two bottom covers.

4. An oil separator device as defined in claim 3, wherein
    the first and second conduit means include separate oil suction pipes which extend through the housing cover and axially along the interior of the second separator element;
    one of the two oil suction pipes has an oil intake opening located near the upper side of the second element bottom cover; and
    the other oil suction pipe extends sealingly through the second element bottom cover, having an oil intake opening located near the upper side of the first element bottom cover.

* * * * *